(12) United States Patent
Ma

(10) Patent No.: US 11,416,405 B1
(45) Date of Patent: Aug. 16, 2022

(54) SYSTEM AND METHOD FOR MAPPING MEMORY ADDRESSES TO LOCATIONS IN SET-ASSOCIATIVE CACHES

(71) Applicant: Marvell Asia Pte Ltd, Singapore (SG)

(72) Inventor: Albert Ma, Belmont, MA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/169,079

(22) Filed: Feb. 5, 2021

Related U.S. Application Data

(60) Provisional application No. 62/971,662, filed on Feb. 7, 2020.

(51) Int. Cl.
*G06F 12/0864* (2016.01)
*G06F 12/0873* (2016.01)
(Continued)

(52) U.S. Cl.
CPC .......... *G06F 12/0864* (2013.01); *G06F 7/727* (2013.01); *G06F 12/0238* (2013.01); *G06F 12/0873* (2013.01); *G06F 12/0891* (2013.01)

(58) Field of Classification Search
CPC ............. G06F 12/0238; G06F 12/0864; G06F 12/0873; G06F 12/0891; G06F 7/727
See application file for complete search history.

(56) References Cited

U.S. PATENT DOCUMENTS 6,044,437 A * 3/2000 Reinders ............. G06F 12/0802
711/122
7,093,075 B2 8/2006 Reohr et al.
(Continued)

FOREIGN PATENT DOCUMENTS

WO 2008149348 A2 12/2008

OTHER PUBLICATIONS

R. Sivakumar et al.; "VLSI Design Methodologies for Computing Xmod m"; Mar. 1995; Technical Report ECE 95-2; Department of Electrical and Computer Engineering, University of Victoria, Victoria.
(Continued)

*Primary Examiner* — Aracelis Ruiz
(74) *Attorney, Agent, or Firm* — Hamilton, Brook, Smith & Reynolds, P.C.

(57) ABSTRACT

A circuit and corresponding method map memory addresses onto cache locations within set-associative (SA) caches of various cache sizes. The circuit comprises a modulo-arithmetic circuit that performs a plurality of modulo operations on an input memory address and produces a plurality of modulus results based on the plurality of modulo operations performed. The plurality of modulo operations performed are based on a cache size associated with an SA cache. The circuit further comprises a multiplexer circuit and an output circuit. The multiplexer circuit outputs selected modulus results by selecting modulus results from among the plurality of modulus results produced. The selecting is based on the cache size. The output circuit outputs a cache location within the SA cache based on the selected modulus results and the cache size. Such mapping of the input memory address onto the cache location is performed at a lower cost relative to a general-purpose divider.

25 Claims, 7 Drawing Sheets

(51) Int. Cl.
  *G06F 7/72* (2006.01)
  *G06F 12/02* (2006.01)
  *G06F 12/0891* (2016.01)

(56) References Cited

U.S. PATENT DOCUMENTS

| | | |
|---|---|---|
| 7,937,535 B2 | 5/2011 | Özer et al. |
| 2020/0310960 A1 | 10/2020 | Hattori |
| 2020/0310969 A1 | 10/2020 | Schuttenberg |

OTHER PUBLICATIONS

Wikipedia; "Cache placement policies"; date retrieved Jan. 7, 2021; https://en.wikipedia.org/wiki/Cache_placement_policies.
Israel Koren; "This is a basic Cache Tutorial"; date retrieved Jan. 7, 2021; http://www.ecs.umass.edu/ece/koren/architecture/Cache/tutorial.html.

* cited by examiner

| | CONFIGURATIONS 252 | | | CALCULATIONS 254 | | |
|---|---|---|---|---|---|---|
| ID 258 | ROWS 262 | COLUMNS 264 | SETS 266 | FIRST LOCATION CALCULATION 256a (e.g., ROW) | SECOND LOCATION CALCULATION 256b (e.g., COLUMN) | THIRD LOCATION CALCULATION 256c (e.g., SET) |
| 1 | 3*(2^A) | 5*(2^B) | 7*(2^C) | ((addr' % 3) << A) addr[A-1:0] | ((addr' % 5) << B) addr[A+B-1:A] | ((addr' % 7) << C) addr'[A+B+C-1:A+B] |
| 2 | 3*(2^A) | 7*(2^B) | 5*(2^C) | ((addr' % 3) << A) addr[A-1:0] | ((addr' % 7) << B) addr[A+B-1:A] | ((addr' % 5) << C) addr'[A+B+C-1:A+B] |
| 3 | 5*(2^A) | 3*(2^B) | 7*(2^C) | ((addr' % 5) << A) addr[A-1:0] | ((addr' % 3) << B) addr[A+B-1:A] | ((addr' % 7) << C) addr'[A+B+C-1:A+B] |
| 4 | 5*(2^A) | 7*(2^B) | 3*(2^C) | ((addr' % 5) << A) addr[A-1:0] | ((addr' % 7) << B) addr[A+B-1:A] | ((addr' % 3) << C) addr'[A+B+C-1:A+B] |
| 5 | 7*(2^A) | 5*(2^B) | 3*(2^C) | ((addr' % 7) << A) addr[A-1:0] | ((addr' % 5) << B) addr[A+B-1:A] | ((addr' % 3) << C) addr'[A+B+C-1:A+B] |
| 6 | 7*(2^A) | 3*(2^B) | 5*(2^C) | ((addr' % 7) << A) addr[A-1:0] | ((addr' % 3) << B) addr[A+B-1:A] | ((addr' % 5) << C) addr'[A+B+C-1:A+B] |
| 7 | 2^A | 5*(2^B) | 7*(2^C) | addr[A-1:0] | ((addr' % 5) << B) addr[A+B-1:A] | ((addr' % 7) << C) addr'[A+B+C-1:A+B] |
| 8 | 2^A | 7*(2^B) | 5*(2^C) | addr[A-1:0] | ((addr' % 7) << B) addr[A+B-1:A] | ((addr' % 5) << C) addr'[A+B+C-1:A+B] |
| 9 | 2^A | 3*(2^B) | 7*(2^C) | addr[A-1:0] | ((addr' % 3) << B) addr[A+B-1:A] | ((addr' % 7) << C) addr'[A+B+C-1:A+B] |
| 10 | 2^A | 7*(2^B) | 3*(2^C) | addr[A-1:0] | ((addr' % 7) << B) addr[A+B-1:A] | ((addr' % 3) << C) addr'[A+B+C-1:A+B] |
| 11 | 2^A | 5*(2^B) | 3*(2^C) | addr[A-1:0] | ((addr' % 5) << B) addr[A+B-1:A] | ((addr' % 3) << C) addr'[A+B+C-1:A+B] |
| 12 | 2^A | 3*(2^B) | 5*(2^C) | addr[A-1:0] | ((addr' % 3) << B) addr[A+B-1:A] | ((addr' % 5) << C) addr'[A+B+C-1:A+B] |
| 13 | 3*(2^A) | 2^B | 7*(2^C) | ((addr' % 3) << A) addr[A-1:0] | addr[A+B-1:A] | ((addr' % 7) << C) addr'[A+B+C-1:A+B] |
| 14 | 3*(2^A) | 2^B | 5*(2^C) | ((addr' % 3) << A) addr[A-1:0] | addr[A+B-1:A] | ((addr' % 5) << C) addr'[A+B+C-1:A+B] |
| 15 | 5*(2^A) | 2^B | 7*(2^C) | ((addr' % 5) << A) addr[A-1:0] | addr[A+B-1:A] | ((addr' % 7) << C) addr'[A+B+C-1:A+B] |
| 16 | 5*(2^A) | 2^B | 3*(2^C) | ((addr' % 5) << A) addr[A-1:0] | addr[A+B-1:A] | ((addr' % 3) << C) addr'[A+B+C-1:A+B] |
| 17 | 7*(2^A) | 2^B | 5*(2^C) | ((addr' % 7) << A) addr[A-1:0] | addr[A+B-1:A] | ((addr' % 5) << C) addr'[A+B+C-1:A+B] |
| 18 | 7*(2^A) | 2^B | 3*(2^C) | ((addr' % 7) << A) addr[A-1:0] | addr[A+B-1:A] | ((addr' % 3) << C) addr'[A+B+C-1:A+B] |
| 19 | 3*(2^A) | 5*(2^B) | 2^C | ((addr' % 3) << A) addr[A-1:0] | ((addr' % 5) << B) addr[A+B-1:A] | addr'[A+B+C-1:A+B] |
| 20 | 3*(2^A) | 7*(2^B) | 2^C | ((addr' % 3) << A) addr[A-1:0] | ((addr' % 7) << B) addr[A+B-1:A] | addr'[A+B+C-1:A+B] |
| 21 | 5*(2^A) | 3*(2^B) | 2^C | ((addr' % 5) << A) addr[A-1:0] | ((addr' % 3) << B) addr[A+B-1:A] | addr'[A+B+C-1:A+B] |
| 22 | 5*(2^A) | 7*(2^B) | 2^C | ((addr' % 5) << A) addr[A-1:0] | ((addr' % 7) << B) addr[A+B-1:A] | addr'[A+B+C-1:A+B] |
| 23 | 7*(2^A) | 5*(2^B) | 2^C | ((addr' % 7) << A) addr[A-1:0] | ((addr' % 5) << B) addr[A+B-1:A] | addr'[A+B+C-1:A+B] |
| 24 | 7*(2^A) | 3*(2^B) | 2^C | ((addr' % 7) << A) addr[A-1:0] | ((addr' % 3) << B) addr[A+B-1:A] | addr'[A+B+C-1:A+B] |
| 25 | 2^A | 2^B | 3*(2^C) | addr[A-1:0] | addr[A+B-1:A] | ((addr' % 3) << C) addr'[A+B+C-1:A+B] |
| 26 | 2^A | 2^B | 5*(2^C) | addr[A-1:0] | addr[A+B-1:A] | ((addr' % 5) << C) addr'[A+B+C-1:A+B] |

FIG. 2B-1

| CONFIGURATIONS 252 | | | | CALCULATIONS 254 | | |
|---|---|---|---|---|---|---|
| ID 258 | ROWS 262 | COLUMNS 264 | SETS 266 | FIRST LOCATION CALCULATION 256a (e.g., ROW) | SECOND LOCATION CALCULATION 256b (e.g., COLUMN) | THIRD LOCATION CALCULATION 256c (e.g., SET) |
| 27 | 2^A | 2^B | 7*(2^C) | addr'[A-1:0] | addr'[A+B-1:A] | ((addr' % 7) << C) \| addr'[A+B+C-1:A+B] |
| 28 | 2^A | 3*(2^B) | 2^C | addr'[A-1:0] | ((addr' % 3) << B) \| addr'[A+B-1:A] | addr'[A+B+C-1:A+B] |
| 29 | 2^A | 5*(2^B) | 2^C | addr'[A-1:0] | ((addr' % 5) << B) \| addr'[A+B-1:A] | addr'[A+B+C-1:A+B] |
| 30 | 2^A | 7*(2^B) | 2^C | addr'[A-1:0] | ((addr' % 7) << B) \| addr'[A+B-1:A] | addr'[A+B+C-1:A+B] |
| 31 | 3*(2^A) | 2^B | 2^C | ((addr' % 3) << A) \| addr'[A-1:0] | addr'[A+B-1:A] | addr'[A+B+C-1:A+B] |
| 32 | 5*(2^A) | 2^B | 2^C | ((addr' % 5) << A) \| addr'[A-1:0] | addr'[A+B-1:A] | addr'[A+B+C-1:A+B] |
| 33 | 7*(2^A) | 2^B | 2^C | ((addr' % 7) << A) \| addr'[A-1:0] | addr'[A+B-1:A] | addr'[A+B+C-1:A+B] |
| 34 | 2^A | 2^B | 2^C | addr'[A-1:0] | addr'[A+B-1:A] | addr'[A+B+C-1:A+B] |

FIG. 2B-2

SYSTEM AND METHOD FOR MAPPING MEMORY ADDRESSES TO LOCATIONS IN SET-ASSOCIATIVE CACHES

RELATED APPLICATION

This application claims the benefit of U.S. Provisional Application No. 62/971,662, filed on Feb. 7, 2020. The entire teachings of the above application are incorporated herein by reference.

BACKGROUND

A set-associative (SA) cache includes a number of sets of cache entries. Typically, each set includes two or more cache entries and an SA cache includes a plurality of such sets. Each individual cache entry in a set may be called a "way." The "way" provides the architectural mechanism for placing a memory block in any one of N locations within each set, where N defines the degree of associativity of the SA cache.

As such, a "way" comprises a plurality of storage locations in the SA cache, one storage location per set. An N-way SA cache is, thus, a cache where each set includes N entries, where N is the associativity of the cache. Different methods exist for mapping memory addresses onto cache locations in an SA cache (for placement of data) because a multiplicity of potential storage locations for data exist within each set of the SA cache.

SUMMARY

According to an example embodiment, a circuit comprises a modulo-arithmetic circuit configured to perform a plurality of modulo operations on an input memory address and to produce a plurality of modulus results based on the plurality of modulo operations performed. The plurality of modulo operations are performed based on a cache size associated with a set-associative (SA) cache. The circuit further comprises a multiplexer circuit coupled to the modulo-arithmetic circuit and configured to produce selected modulus results by selecting modulus results from among the plurality of modulus results produced. The selecting is based on the cache size. The circuit further comprises an output circuit coupled to the multiplexer circuit. The output circuit is configured to output a cache location based on the selected modulus results and the cache size. The cache location is within the SA cache.

The multiplexer circuit may include a plurality of multiplexers and the selecting may cause at least a portion of the plurality of modulus results to be steered among the plurality of multiplexers and combined with respective distinct portions of the input memory address.

The circuit may be a programmable mapper circuit. The cache size may be a given cache size of a plurality of cache sizes supported by the programmable mapper circuit. Each cache size of the plurality of cache sizes is associated with a respective equation of a plurality of equations. The programmable mapper circuit may be programmed based on the cache size to compute the respective equation to map the input memory address onto the cache location.

The programmable mapper circuit may be programmed based on the cache size to compute a given equation of a plurality of equations. Each equation of the plurality of equations is configured to compute the cache location based on the input memory address. The programmable mapper circuit may be programmed based on the cache size to cause the plurality of multiplexers to perform the selecting in a manner that enables the programmable mapper circuit to compute the given equation.

The programmable mapper circuit may be further configured to employ a common set of modulo operations of the plurality of modulo operations to compute the given equation. The common set is shared among the plurality of equations.

The input memory address may be a memory address of a memory location in a memory or a representation of the memory address. Outputting the cache location may cause the cache location to be read or written in response to a read from or write to the memory address, respectively.

The cache size may be a total number of sets of the SA cache wherein the total number of sets is based on a total number of columns of banks of a plurality of banks in the SA cache, a total number of rows of banks of the plurality of banks, and a per-bank set number defining a total number of sets within each bank of the plurality of banks.

The cache location may be identified by a row, column, and set, wherein the row and column identify a bank of a plurality of banks of the SA cache, and wherein the set identifies a given set of a plurality of sets within the bank identified.

The selected modulus results produced by the multiplexer circuit may include a first, second, and third selected modulus result. The cache location may be defined by a first location in a first dimension, a second location in a second dimension, and third location in a third dimension. The output circuit may include a plurality of shifters. At least a portion of the plurality of shifters may be configured to perform respective bitwise left-shift operations on the first, second, and third selected modulus results used to produce the first, second, and third locations in the first, second, and third dimensions, respectively. The circuit may be programmed based on the cache size to control the respective bitwise left-shift operations performed. It should be understood, however, that the selected modulus results are not limited to the first, second, and third modulus results and that the cache location is not limited to being defined by the first, second, and third locations in the first, second, and third dimensions, respectively. The first, second, and third locations in the first, second, and third dimensions, respectively, may correspond to a row, column, and set, respectively, of the SA cache; however, the SA cache is not limited to having its cache locations identified by a row, column, and set. For example, a cache location may be identified by a row and set. Alternatively, the cache location may be identified a chip, row, column, and set.

The cache size may be a given cache size among a plurality of cache sizes of SA caches. The modulo-arithmetic circuit and multiplexer circuit may be based on respective decompositions of the plurality of cache sizes into prime factors. At least a portion of the plurality of modulo operations may be determined based on the prime factors.

According to another example embodiment, a method comprises performing a plurality of modulo operations on an input memory address and producing a plurality of modulus results based on the plurality of modulo operations performed. The plurality of modulo operations are performed based on a cache size associated with a set-associative (SA) cache. The method further comprises producing selected modulus results by selecting modulus results from among the plurality of modulus results produced. The selecting is based on the cache size. The method further comprises outputting a cache location based on the selected modulus results and the cache size. The cache location is within the SA cache.

Further alternative method embodiments parallel those described above in connection with the example circuit embodiment.

According to another example embodiment, a system comprises a programmable mapper circuit configured to map an input memory address onto a cache location. The programmable mapper circuit includes a modulo-arithmetic circuit, a multiplexer circuit, and an output circuit. The modulo-arithmetic circuit is configured to perform a plurality of modulo operations on the input memory address and produce a plurality of modulus results based on the plurality of modulo operations performed. The plurality of modulo operations are performed based on a cache size. The system further comprises a set-associative (SA) cache coupled to the programmable mapper circuit. The cache size is associated with the SA cache. The multiplexer circuit is configured to produce selected modulus results by selecting modulus results from among the plurality of modulus results produced. The selecting is based on the cache size. The output circuit is configured to output the cache location based on the selected modulus results and the cache size. The cache location is within the SA cache.

Alternative system embodiments parallel those described above in connection with the example circuit embodiment.

According to another example embodiment, a non-transitory computer-readable medium having encoded thereon a sequence of instructions which, when loaded and executed by a processor, causes the processor to perform a plurality of modulo operations on an input memory address and produce a plurality of modulus results based on the plurality of modulo operations performed. The plurality of modulo operations are performed based on a cache size associated with a set-associative (SA) cache. The sequence of instructions further causes the processor to produce selected modulus results by selecting modulus results from among the plurality of modulus results produced. The selecting is based on the cache size. The sequence of instructions further causes the processor to output a cache location based on the selected modulus results and the cache size. The cache location is within the SA cache.

Alternative non-transitory computer-readable medium embodiments parallel those described above in connection with the example circuit embodiment.

According to yet another example embodiment, a system comprises means for performing a plurality of modulo operations on an input memory address and producing a plurality of modulus results based on the plurality of modulo operations performed. The plurality of modulo operations are performed based on a cache size associated with a set-associative (SA) cache. The system further comprises means for producing selected modulus results by selecting modulus results from among the plurality of modulus results produced. The selecting may be based on the cache size. The system further comprises means for outputting a cache location based on the selected modulus results and the cache size, the cache location within the SA cache.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2B-1 is table of an example embodiment of configurations for the SA cache of the circuit of FIG. 2A.

FIG. 2B-2 is a continuation of the table of FIG. 2B-1.

DETAILED DESCRIPTION

Figure 1:
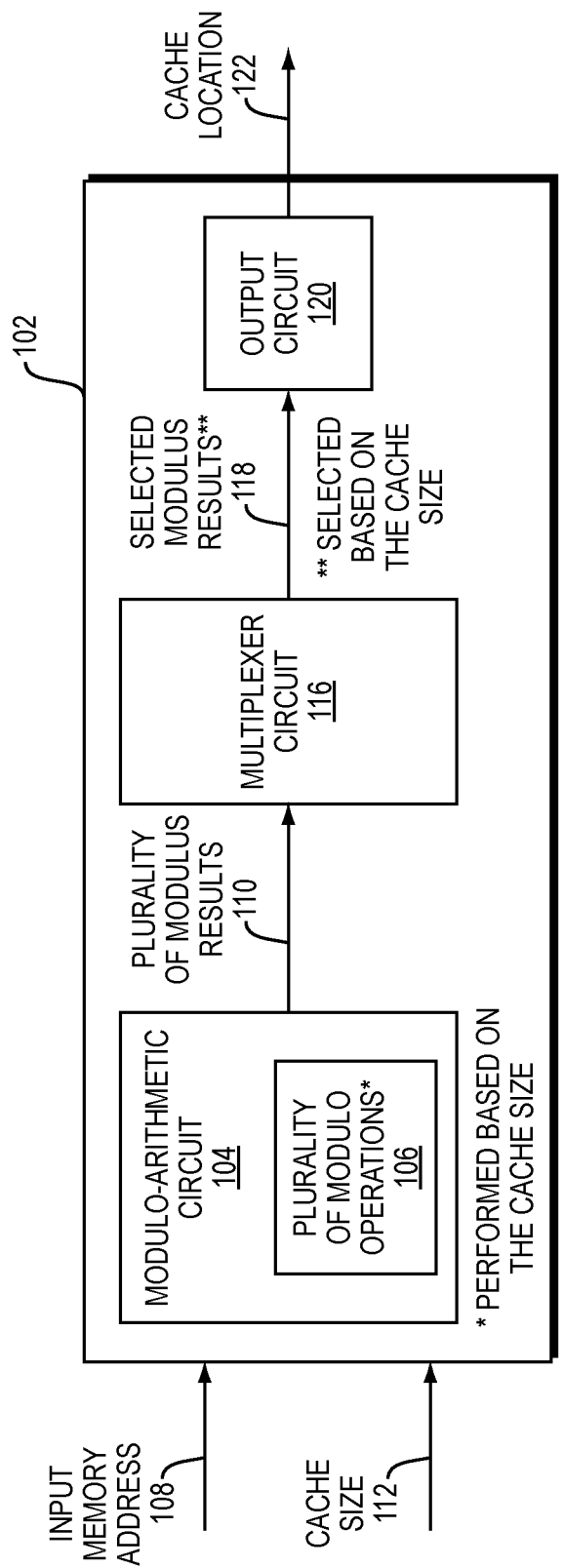
FIG. 1 is a block diagram of an example embodiment of a circuit that may be used to map memory addresses onto cache locations within set-associative (SA) caches.

A description of example embodiments follows. In a set-associative (SA) memory cache, referred to interchangeably herein as an SA cache, there is the problem of deciding where in the SA cache each block of memory can be placed. This mapping of memory addresses onto cache sets can affect the performance of the SA cache. It is useful to ensure that all SA cache sets are utilized to the greatest extent possible to minimize a number of required accesses to slower cache or memory. Further, large SA caches are typically banked, allowing simultaneous access to multiple parts of the SA cache. Spreading accesses across such banks increases the aggregate bandwidth achieved.

For example, and without loss of generality, an SA cache may be organized into rows and columns of banks. The number of sets in the SA cache may be given by $S=X \times Y \times Z$, where S is the total number of sets, X is the number of columns of banks, Y is the number of rows of banks, and Z is the number of sets within each bank. The sets in the SA cache can be numbered from 0 to S−1.

A straightforward mapping of address blocks to sets is $s=A \bmod S$, where A is the block address and s is the target set. This mapping ensures that the same number of block addresses (give or take one) map onto each set. This performs optimally for a uniformly distributed stream of cache accesses. When the accesses are not uniformly distributed, however, this straightforward mapping does not perform well. This is most evident when the accesses are strided, that is, only one in every $n^{th}$ block is accessed. It can be shown that only $1/\gcd(n, S)$ of the SA cache is actually used, where "gcd" is the greatest common divisor. In the common case that n is a power of two and S has many factors of two, much of the SA cache is lost (i.e., unused). A conventional solution to address this issue is to apply a permutation on A before calculating the modulus, thereby producing A'. This can be done, conventionally, by multiplication with an invertible matrix over the field GF(2). This, in a sense, randomizes bits in the address, provided the matrix is well designed. Conventionally, A' may be produced, for example, by applying a hash on A. It should be understood, however, that A', that is, a representation of A, is not limited to being produced as disclosed herein.

The computation of A' mod S can be expensive. In the most general case, where S is unknown and can take on any value within a range, the computation can be done with a general-purpose restoring divider, which is large and slow. In the case that S is a constant, depending on the constant, many optimizations can be performed to yield a small and fast design. As such, a design that allows for some degree of flexibility but without a huge cost in area, delay, or design complexity, is useful. An example embodiment disclosed herein enables such computation to be performed for various configurations of an SA cache, that is, for a plurality of different SA caches with different cache sizes, however, such computation is performed based on a hardware design that employs less hardware components than that of a general-purpose divider. Example embodiments of hardware that maps addresses onto locations within SA caches having various configurations (i.e., cache sizes) are disclosed further below.

Any S can be decomposed into its prime factors, $S=2^a 3^b 5^c 7^d \ldots$ Number theory tells that the computation of A' mod S is congruent to the computation of: (A' mod $2^a$, A' mod $3^b$, A' mod $5^c$, A' mod $7^d \ldots$), where A' mod $2^a$ is simply the lowest a bits of A'. Values for A' mod $3^{b*}$, A' mod $5^{c*}$, A' mod $7^{d*}$ and be computed, where b*, c*, d* are constants chosen such that b*≥b (and so on) for any configuration of interest, and then convert A' mod $3^{b*}$ into A' mod $3^b$ (and so on) with varying degree of complexity. Finally, modulus (i.e., "mod") values can be re-combined to yield x, y, z, where x, y, z defines the cache location in terms of column, row, and set, respectively. It is possible to (trivially) re-combine values in the case where there is only one prime power besides the powers of two. Such can be understood by means of the example disclosed below.

For example, the following values may be chosen: b*=1, c*=1, d*=1. As such, the dimensions X, Y, Z are constrained such that each is some power of 2, optionally multiplied by 3, 5, or 7, such as is shown in the configurations 252 listed in table 250 of FIGS. 2B-1 and 2B-2, disclosed further below. Further, at most one dimension can have the factor of 3, at most one dimension can have the factor of 5, and at most one dimension can have the factor of 7. An example configuration could be $X=2^2 3$, $Y=2^2 5$, $Z=2^{10} 7$, so S=1720320. Instead of calculating A' mod 1720320 and from there computing the locations x, y, z (in the dimensions X, Y, Z, respectively) that define the cache location. The location x (also referred to herein as a first location) in the X dimension (also referred to interchangeably herein as X) can be directly computed by A' mod 3 concatenated to the lowest 2 bits of A'. The location y (also referred to interchangeably herein as a second location) in the Y dimension (also referred to interchangeably herein as a second dimension) can be computed by A' mod 5 concatenated to the next 2 lowest bits of A'. Further, the location z (also referred to interchangeably herein as a third location) in the Z dimension (also referred to interchangeably herein as a third dimension) can be computed by A' mod 7 concatenated to the next 10 bits of A'. With an appropriate muxing (i.e., multiplexer) circuit, the same hardware can be used to map input addresses to SA caches of varying configurations, that is, to SA caches of various sizes (e.g., various dimensions). An example embodiment of such a circuit is disclosed further below with regard to FIGS. 1-3.

Figure 2A:
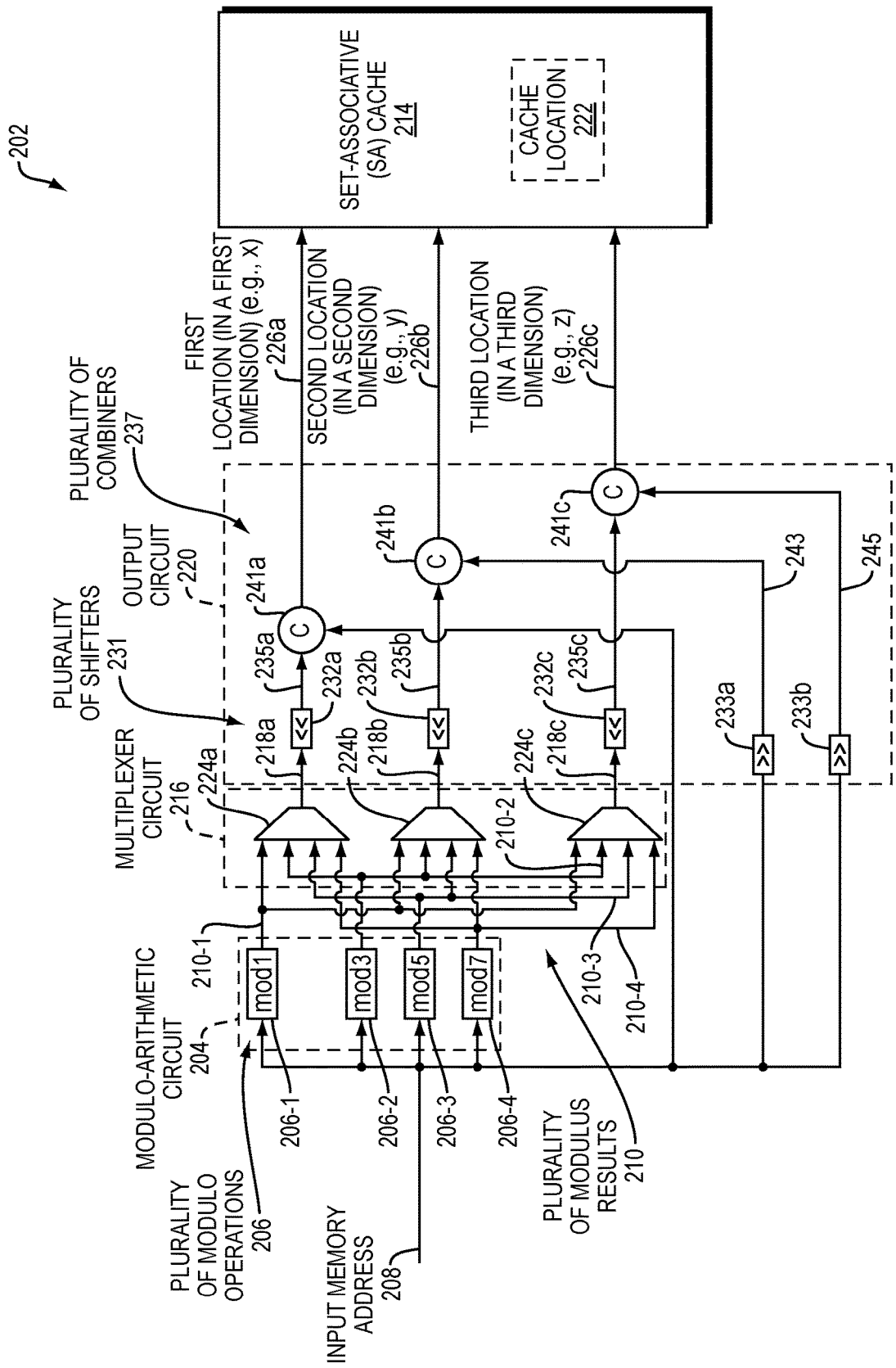
FIG. 2A is a block diagram of another example embodiment of a circuit that may be used to map memory addresses onto cache locations within SA caches.

For example, FIG. 2A is an example embodiment of such hardware supporting prime powers of 1 for each dimension. The example embodiment of FIG. 2A can, however, be easily extended to prime powers greater than 1. For example, with mod 9 hardware, two factors of 3 or a factor of 9 can be employed in the X, Y, Z configurations. All this can be done at a lower cost than that of a general-purpose divider that computes A' mod S, where S is unknown and can take on any value within a range.

An example embodiment disclosed herein provides a programmable circuit that can be employed to map memory addresses onto cache locations with SA caches that have n varying configurations, that is, n varying cache sizes. Based on the varying n cache sizes that the programmable circuit is to support, that is, the respective S=X×Y×Z configurations, each S can be decomposed into its prime factors to work out n equations for mapping an input memory address onto a cache location. A circuit may be designed that can be employed for computing each of the n equations where such n equations employ a common set of modulo operations. Based on a given cache size, the circuit can be programmed to compute the given equation, for example, by configuring multiplexers of the circuit to select modulus results and enable modulus results of modulo operations performed to be combined according to the given equation to output a cache location that is computed based on the given equation.

An example embodiment provides flexibility because it is programmable and can support multiple cache sizes. The example embodiment can perform modulo operations that employ small constants and, thus, is less complex and employs less hardware relative to a generalized approach that performs division over an entire range of cache sizes. An example embodiment enables the same hardware circuit to be employed among a plurality of different hardware designs that employ different configurations (e.g., sizes) of SA caches and, thus, avoids custom hardware designs for each of the different configurations. Further, an example embodiment supports cache sizes that are based on dimensions that are based on factors that are greater than two in combination with any number of factors of two. The set of equations supported by an example embodiment may utilize a common set of modulo operators and the results of same may be employed based on configuring select signals for multiplexers to steer and combine the modulus results with respective distinct portions of the input memory address in a manner that implements a given equation. As the given equation corresponds to a respective cache size, the select signals for the multiplexers may be configured (i.e., programmed) based on same. An example embodiment of a programmable circuit that employs such modulo operators and multiplexers is disclosed below.

FIG. 1 is a block diagram of an example embodiment of a circuit 102 that may be used to map memory addresses onto cache locations within set associative (SA) caches, such as the SA cache 214 of FIG. 2A, disclosed further below. The circuit 102 may be referred to interchangeably herein as a programmable mapper and is programmed based on a cache size of an SA cache such that the circuit 102 maps memory addresses onto cache locations for an SA cache of that cache size.

The circuit 102 comprises a modulo-arithmetic circuit 104 configured to perform a plurality of modulo operations 106 on an input memory address 108 and to produce a plurality of modulus results 110 based on the plurality of modulo operations 106 performed. The input memory address 108 may also be referred to herein as an input block memory address that may point to block of memory in a memory (not shown). The input memory address 108 may be a physical memory address or a representation of the physical memory address. For example, the input memory address 108 may be a permutation of hash of a physical memory address, such as disclosed above.

Continuing with FIG. 1, the plurality of modulo operations 106 are performed based on a cache size 112 associated with an SA cache, such as the SA cache 214 of FIG. 2A, disclosed further below. The circuit 102 further comprises a multiplexer circuit 116 coupled to the modulo-arithmetic circuit 104 and configured to produce selected modulus results 118 by selecting modulus results from among the plurality of modulus results 110 produced. The selecting is based on the cache size 112. Such selecting may be performed by configuring respective input select signals to the multiplexers (not shown) of the multiplexer circuit 116 based on the cache size. The cache size 112 may be a programmed value that is input to the circuit 102.

The circuit 102 further comprises an output circuit 120 coupled to the multiplexer circuit 116. The output circuit 120 is configured to output a cache location 122 based on the selected modulus results 118 and the cache size 112. The cache location 122 is within the SA cache. The multiplexer circuit 116 may include a plurality of multiplexers, such as the first multiplexer 224a, second multiplexer 224b, and third multiplexer 224c of FIG. 2A, disclosed below.

FIG. 2A is a block diagram of another example embodiment of a circuit 202 that may be used to map memory addresses onto cache locations within SA caches. According to the example embodiment, the circuit 202 supports varying X, Y, Z dimensions with 1 factor each of 3, 5, and 7. It should be understood, however, that the x, y, z locations (in the X, Y, Z dimensions, respectively) defining a cache location 222 onto which an input memory address 208 can be mapped, are not limited to 1 factor each of 3, 5, and 7. Further, it should be understood that embodiments disclosed herein may support X, Y, Z dimensions of powers greater than two as well as any number of powers of two.

Referring to FIG. 2A, the circuit 202 may be employed as the circuit 102 of FIG. 1, disclosed above. The circuit 202 comprises a modulo-arithmetic circuit 204 configured to perform a plurality of modulo operations 206, such as the modulo operations 206-1, 206-2, 206-3, and 206-4, that are performed on an input memory address 208 and produce a plurality of modulus results 201, namely the 210-1, 210-2, 210-3, and 210-4 modulus results in the example embodiment. It should be understood that a number and type of the plurality of modulo operations 206 performed by the circuit 202 is not limited to the number or type of modulo operations of FIG. 2A. Further, an arrangement of the plurality of modulo operations is not limited to the arrangement of the plurality of modulo operations 206 disclosed in FIG. 2A. The plurality of modulo operations 206 are performed based on a cache size (not shown) associated with the SA cache 214.

The circuit 202 further comprises a multiplexer circuit 216 coupled to the modulo-arithmetic circuit 204 and configured to produce selected modulus results 218a, 218b, and 218c by selecting modulus results from among the plurality of modulus results 210 produced. The selecting is based on the cache size. The circuit 202 further comprises an output circuit 220 coupled to the multiplexer circuit 216. The output circuit 220 is configured to output a cache location 222 based on the selected modulus results (i.e., 218a, 218b, and 218c) and the cache size. The cache location 222 is within the SA cache 214.

The multiplexer circuit 216 includes a plurality of multiplexers, namely the first multiplexer 224a, second multiplexer 224b, and third multiplexer 224c. It should be understood that the plurality of multiplexers is not limited to the first multiplexer 224a, second multiplexer 224b, and third multiplexer 224c. Further, it should be understood that the arrangement, number, and type of multiplexers of the plurality of multiplexers is not limited to the first multiplexer 224a, second multiplexer 224b, and third multiplexer 224c disclosed in FIG. 2A. The selecting may cause at least a portion of the plurality of modulus results 210 to be steered among the plurality of multiplexers, such as the first multiplexer 224a, second multiplexer 224b, and third multiplexer 224c in the example embodiment of FIG. 2A, and combined with respective distinct portions of the input memory address 208, as disclosed further below. The selecting is based on the cache size.

The circuit 202 may be referred to interchangeably herein as a programmable mapper circuit, or simply, a programmable mapper. The cache size may be a given cache size of a plurality of cache sizes supported by the programmable mapper circuit. Each cache size of the plurality of cache sizes is associated with a respective equation of a plurality of equations (not shown). The programmable mapper circuit may be programmed based on the cache size to compute the respective equation to map the input memory address 208 onto the cache location 222.

The programmable mapper circuit may be programmed based on the cache size to compute a given equation (not shown) of a plurality of equations, such as disclosed further below with regard to FIGS. 2B-1 and 2B-2. Each equation of the plurality of equations is configured to compute the cache location 222 based on the input memory address 208. The programmable mapper circuit may be programmed based on the cache size to cause the plurality of multiplexers (e.g., 224a, 224b, and 224c) to perform the selecting in a manner that enables the programmable mapper circuit to compute the given equation. The programmable mapper circuit may be further configured to employ a common set of modulo operations of the plurality of modulo operations to compute the given equation. The common set is shared among the plurality of equations.

The input memory address 208 may be a memory address of a memory location (not shown) in a memory (not shown) or a representation of the memory address. For example, the input memory address 208 may be a hash value or other value that represents the input memory address 208. Outputting the cache location 222 may cause the cache location 222 to be read or written in response to a read from or write to the memory address, respectively.

The cache size may be a total number of sets (not shown) of the SA cache 214 wherein the total number of sets is based on a total number of columns (not shown) of banks of a plurality of banks (not shown) in the SA cache 214, a total number of rows (not shown) of banks of the plurality of banks, and a per-bank set number defining a total number of sets within each bank of the plurality of banks. The cache location 222 may be identified by a row, column, and set, wherein the row and column identify a bank of a plurality of banks of the SA cache 214, and wherein the set identifies a given set of a plurality of sets within the bank identified.

The selected modulus results produced by the multiplexer circuit 216 may include a first selected modulus result 218a, second selected modulus result 218b, and third selected modulus result 218c. The cache location 222 may be defined by a first location 226a in a first dimension (not shown), a second location 226b in a second dimension (not shown), and a third location 226c in a third dimension (not shown). The first location 226a, second location 226b, and third location 226c represent coordinates of the cache location 222 within the SA cache 214. As such, the cache location 222 may be output by outputting coordinates that identify the cache location 222, namely the first location 226a in the first dimension, the second location 226b in the second dimension, and the third location 226c in the third dimension.

The output circuit 220 may include a plurality of shifters 231. At least a portion of the plurality of shifters 231 may be configured to perform respective bitwise left-shift operations on the first selected modulus result 218a, second selected modulus result 218b, and third selected modulus result 218c used to produce the first location 226a, second location 226b, and third location 226c in the first, second, and third dimensions, respectively. The circuit 202 may be programmed based on the cache size to control the respective bitwise left-shift operations performed.

The plurality of shifters 231 may be programmable bitwise shifters configured to bitwise-shift respective inputs based on a respective programmable value(s), such as A, B, or C disclosed further below, or a combination thereof, that may control a number of bitwise-shift operations to be performed on the respective inputs. Such respective programmable values may be controlled by a controller (not shown) that may be a processor, such as disclosed below with regard to FIG. 5, or implemented in software/firmware, integrated circuit(s) (e.g., field programmable gate array (FPGA), application-specific integrated circuit (ASIC), etc.), or equivalent or combination thereof.

The plurality of shifters 231 may include bitwise-left shifters and bitwise-right shifters, such as the first bitwise-left shifter 232a, second bitwise-left shifter 232b, and third bitwise-left shifter 232c, and the first bitwise-right shifter 233a and second bitwise-right shifter 233b, respectively, in the example embodiment of FIG. 2A. It should be understood that the plurality of shifters 231 are not limited to the number and arrangement disclosed in FIG. 2A. The bitwise-left shifters may be configured to perform respective bitwise-left shift operations on the selected modulus results (e.g., 218a, 218b, and 218c) to produce bitwise-left-shifted modulus results, such as the first bitwise-left-shifted modulus result 235a, second bitwise-left-shifted modulus result 235b, and third bitwise-left-shifted modulus result 235c.

The output circuit 220 may further include a plurality of combiners 237, such as the first combiner 241a, second combiner 241b, and third combiner 241c. It should be understood that a number and arrangement of the plurality of combiners 237 is not limited to the number and arrangement of combiners disclosed in FIG. 2A. The plurality of combiners 237 may be configured to produce coordinates of the cache location 222, that is, the first location 226a, second location 226b, and third location 226c, in the first, second, and third dimensions, respectively, by combining respective bitwise-left-shifted modulus results of the bitwise-left-shifted modulus results with respective address bits selected from the input memory address 208. The respective address bits that are selected and combined with respective bitwise-left-shifted modulus results may be referred to interchangeably herein as respective relevant bits. Each combiner of the plurality of combiners 237 may employ a distinct set of address bits from the input memory address 208. The distinct set may be distinct relative to respective sets of address bits from the input memory address 208 that are employed by other combiners of the plurality of combiners 237 for combining with respective bitwise-left-shifted modulus results.

The plurality of combiners 237 may include respective arrangements of AND-OR circuitry (not shown) to perform the combining. Each combiner of the plurality of combiners 237 may be presented with a distinct set of address bits from the input memory address 208, that is, each combiner receives such a distinct set as an input. For example, in the example embodiment of FIG. 2A, the circuit 202 is configured to input all bits from the input memory address 208 to the first combiner 241a. As such, all bits from the input memory address 208 are presented to the first combiner 241a, whereas the second combiner 241a is presented with the first bitwise-right shifted bits 243 of the input memory address 208, as output from the first bitwise-right shifter 233a, and the third combiner 241c is presented with the second bitwise-right shifted bits 245 of the input memory address 208, as output from the second bitwise-right shifter 233b.

The first combiner 241a is configured to apply a first mask (not shown) to the input memory address 208, such as via respective AND-gate circuitry (not shown), and to produce the first location 226a by performing a first bitwise-logical OR operation (not shown) on the first bitwise-left-shifted modulus result 235a and the input memory address 208 masked. According to an example embodiment, the first mask may be configured to mask the input memory address 208 such that the lowest A bits are relevant, that is all bits of the input memory address 208 except for the lowest A bits are set to zero, such as by applying an AND operation of those bits with zero. Thus, respective bit values of the lowest A bits are retained for combining with the first bitwise-left-shifted modulus result 235a via the first bitwise-logical OR operation to produce the first location 226a in the first dimension.

The second combiner 241b is configured to apply a second mask (not shown) to the first bitwise-right shifted bits 243 of the input memory address 208, such as via respective AND-gate circuitry (not shown), and to produce the second location 226b by performing a second bitwise-logical OR operation (not shown) on the second bitwise-left-shifted modulus result 235b and the first bitwise-right shifted bits 243 of the input memory address 208 masked. According to an example embodiment, the second mask may be configured to mask the first bitwise-right shifted bits 243 such that a set of B bits consecutively higher than the set of A bits are relevant. As such, all bits of first bitwise-right shifted bits 243 except for the set of B bits are set to zero, such as by applying an AND operation to those remaining bits such that they are set to a zero value. Thus, respective bit values of the bits in the set of B bits are retained for combining with the second bitwise-left-shifted modulus result 235b via the second bitwise-logical OR operation to produce the second location 226b in the second dimension.

The third combiner 241c is configured to apply a third mask (not shown) to the second bitwise-right shifted bits 245 of the input memory address 208, such as via respective AND-gate circuitry (not shown), and to produce the second location 226c by performing a second bitwise-logical OR operation (not shown) on the third bitwise-left-shifted modulus result 235c and the second bitwise-right shifted bits 245 of the input memory address 208 masked. According to an example embodiment, the third mask may be configured to mask the second bitwise-right shifted bits 245 such that a set of C bits consecutively higher than the set of A+B bits are relevant. As such, all bits of second bitwise-right shifted bits 245 except for the set of A+B bits are set to zero, such as by applying an AND operation to those remaining bits such that they are set to a zero value. Thus, respective bit values of the bits in the set of C bits are retained for combining with the third bitwise-left-shifted modulus result 235c via the third bitwise-logical OR operation to produce the third location 226c in the third dimension.

Values for A, B, and C, disclosed above, may be programmable within respective ranges supported by the circuit 202, as defined by a designer (not shown) of the circuit 202. Such values for A, B, and C may be referred to interchangeably herein as first, second, and third input parameters that may be input to the circuit 202. The controller, disclosed above, may be configured to deny or accept such first, second, and third input parameters, that is, the programmable values for A, B, and C, if at least one of the input parameters is outside of its respective range defined. If denied, the controller may be configured to employ a respective default value(s) that is within the respective range and drive an error signal (not shown) to reflect that at least one of the requested settings is invalid, that is, outside of a respective range for the circuit 202.

The first, second, and third input parameters, namely the respective values for A, B, and C, may be arbitrary integers within their respective defined ranges and represent a number of factors of 2 in the first, second, and third dimensions (e.g., row, column, set), respectively, thereby defining a size of the particular cache, such as the SA cache 214 of FIG. 2A. For example, if the cache configuration (i.e., size) of the SA cache 214 supports a total of 224 rows, that is, the first dimension includes 224 rows in total, then decomposing 224 into factors of 2 yields 7*2^5 and, as such, a value for the first input parameter, that is, A, is A=5. It should be understood that such value of 224 for the total number of rows is for illustrative purposes and that the first dimension of the SA cache 214 is not limited thereto.

In addition to controlling such masking, disclosed above, the first, second, and third input parameters, namely the respective values for A, B, and C, may also be employed for controlling respective shifting values for the plurality of shifters 231. For example, in the example of FIG. 2A, the first bitwise-right shifter 233a may be configured to shift-right the input memory address 208 by the first input parameter, that is, by a number of A bits. The second bitwise-right shifter 233b may be configured to shift-right the input memory address 208 by a sum of the first and second input parameters, that is, by a number of A+B bits.

The first, second, and third input parameters, namely the respective values for A, B, and C, may further control the respective bitwise-left shifting operations of the first bitwise-left shifter 232a, second bitwise-left shifter 232b, and third bitwise-left shifter 232c, such as disclosed below with regard to FIGS. 2B-1 and 2B-2.

FIG. 2B-1 is table 250 of an example embodiment of configurations 252 for the SA cache 214 of the circuit 202 of FIG. 2A, disclosed above.

FIG. 2B-2 is continuation of the table 250 of FIG. 2B-1. With reference to FIGS. 2A, 2B-1, and 2B-2, each of the configurations 252 (i.e., sizes) in table 250 is for the SA cache 214 and is identified by a respective identifier (ID) 256. Not counting all of the variations on the powers of 2, which are too numerous to list, table 250 lists 34 cache configurations (i.e., sizes) for the SA cache 214 that are enabled by the example embodiment of the circuit 202.

Each configuration of the configurations 252 is defined by a respective set of a total number of rows 262, total number of columns 264, and total number of sets 266, that represent the first, second, and third dimensions, respectively, for a given configuration identified by the ID 258 for the SA cache 214. The table 250 includes respective equations for performing calculations 254 for computing the first location 226a, second location 226b, and third location 226c, that represent the coordinates for the cache location 222 within the SA cache 214.

For example, in the table 250, for a given configuration identified by the identifier 258, the first location 226a may be computed based on the first location calculation 256a, the second location 226b may be computed based on the second location calculation 256b, and the third location 226c may be computed based on the third location calculation 256c. As shown in table 250, the configurations 252 are based on programmable values for the first, second, and third input parameters, that is, A, B, and C, respectively, disclosed above. The equations for computing the first location 226a, second location 226b, and third location 226c are also based on the first, second, and third input parameters, that is, A, B, and C, respectively, as defined by the first location calculation 256a, second location calculation 256b, and third location calculation 256c, respectively.

For the equations disclosed in table 250, "addr" is the input memory address 208, % means modulo, << means left shift, | means OR, and [ ] means bit range. As such, it should be understood that specific modulo operations shown in table 250 are performed by the respective modulo operation of the plurality of modulo operations 206 of the modulo-arithmetic circuit 204 of the circuit 202. In addition, a << left shift operation shown in the first location calculation 256a would be performed by the first bitwise-left shifter 232a, whereas a << left shift operation shown in the second location calculation 256b would be performed by the second bitwise-left shifter 232b, and a << left shift operation shown in the third location calculation 256c would be performed by the third bitwise-left shifter 232c. Further, a | OR operation shown in the first location calculation 256a would be performed by the first combiner 241a, whereas a | OR operation shown in the second location calculation 256b would be performed by the second combiner 241b, and a | OR operation shown in the third location calculation 256c would be performed by the third combiner 241c.

As such, the cache size may be a given cache size among a plurality of cache sizes of SA caches, such as disclosed in FIGS. 2B-1 and 2B-2. The modulo-arithmetic circuit 204 and multiplexer circuit 216 may be based on respective decompositions of the plurality of cache sizes into prime factors. At least a portion of the plurality of modulo (i.e., "mod") operations 206, such as the mod 3 operation (i.e., 206-2, mod 5 operation (i.e., 206-3), and mod 7 operation (i.e., 206-4) in the example embodiment, may be determined based on the prime factors, such as disclosed above. Further, the plurality of modulo operations may include a mod 1 operation (i.e., 206-1). It should be understood that such a modulo operation that outputs a value of 0 irrespective of the input need not actually be performed. For example, the modulus result 210-1 (shown as output from the mod 1 operation 206-1 and input to the multiplexer circuit 216) could simply be coupled to ground (not shown) or other voltage level (not shown) that represents the value 0, that is, the modulus result of the mod 1 operation.

As disclosed above, the circuit 202 may be programmed, for example, by a controller, based on the cache size identified by the ID 258 in table 250 to cause the plurality of multiplexers, that is the first multiplexer 224a, second multiplexer 224b, and third multiplexer 224c in the example embodiment of FIG. 2A, to perform the selecting in a manner that enables the circuit 202 to compute the given equation. For example, the controller may be configured to set respective control signals (not shown) to the first multiplexer 224a, second multiplexer 224b, and third multiplexer 224c to drive the selecting in accordance with equations for the first location calculation 256a, second location calculation 256b, and third location calculation 256c, respectively, for the ID 258 that is selected. Further, as disclosed in table 250, there is a common set of modulo operations, namely mod 3, mod 5, and mod 7, employed for computing the various equations of table 250 that are computed based on the cache size selected, that is, based on the ID 258 that is selected.

Figure 3:
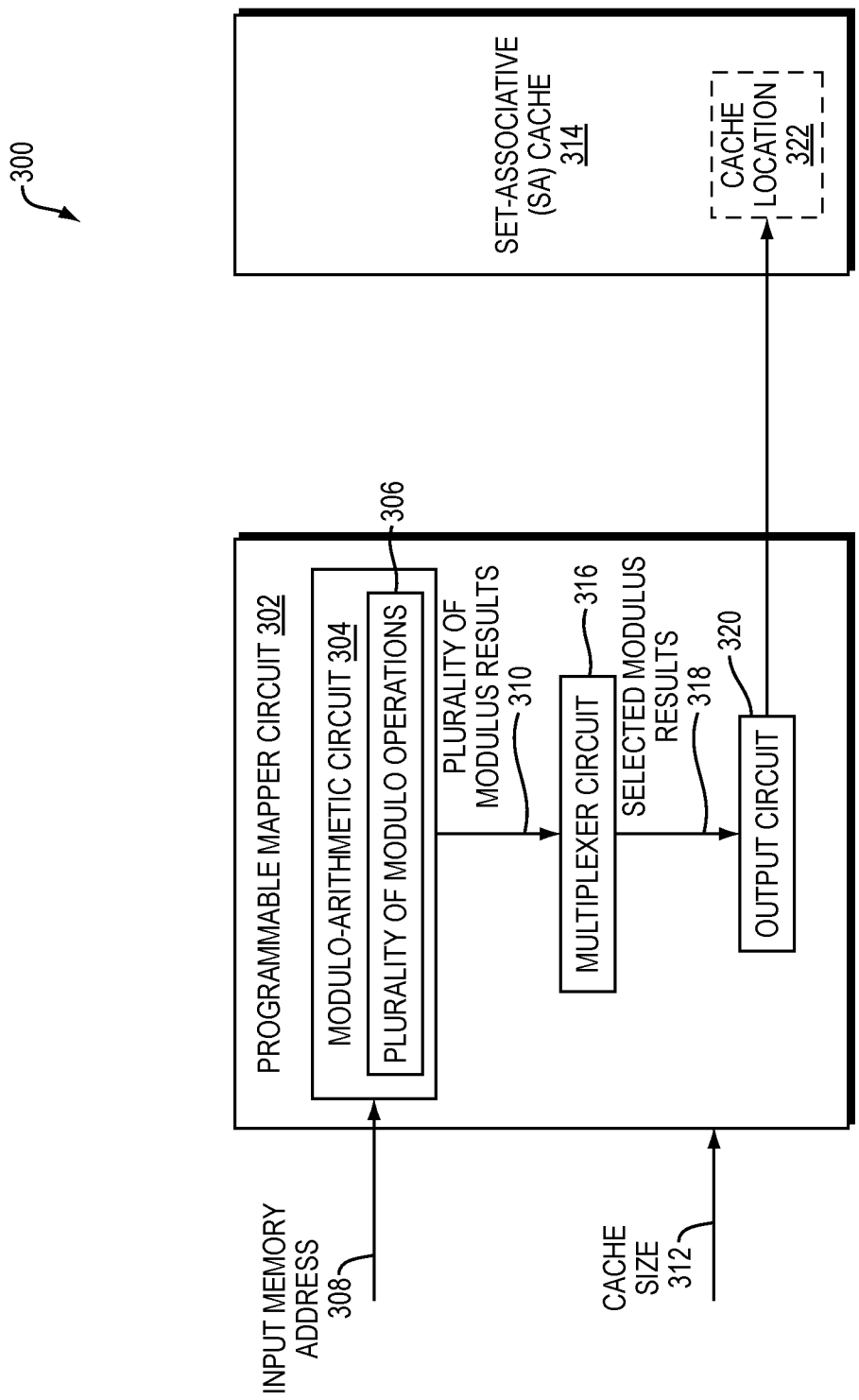
FIG. 3 is a block diagram of an example embodiment of a system that comprises a programmable mapper circuit configured to map an input memory address onto a cache location.

FIG. 3 is a block diagram of an example embodiment of a system 300 that comprises a programmable mapper circuit 302 configured to map an input memory address 308 onto a cache location 322. The programmable mapper circuit 302 includes a modulo-arithmetic circuit 304, a multiplexer circuit 316, and an output circuit 320. The modulo-arithmetic circuit 304 is configured to perform a plurality of modulo operations 306 on the input memory address 308 and produce a plurality of modulus results 310 based on the plurality of modulo operations 306 performed. The plurality of modulo operations 306 are performed based on a cache size 312. The system 300 further comprises a set-associative (SA) cache coupled to the programmable mapper circuit 302. The cache size 312 is associated with the SA cache 314. The multiplexer circuit 316 is configured to produce selected modulus results 318 by selecting modulus results from among the plurality of modulus results 310 produced. The selecting is based on the cache size 312. The output circuit 320 is configured to output the cache location 322 based on the selected modulus results 318 and the cache size 312. The cache location 322 is within the SA cache 314.

Figure 4:
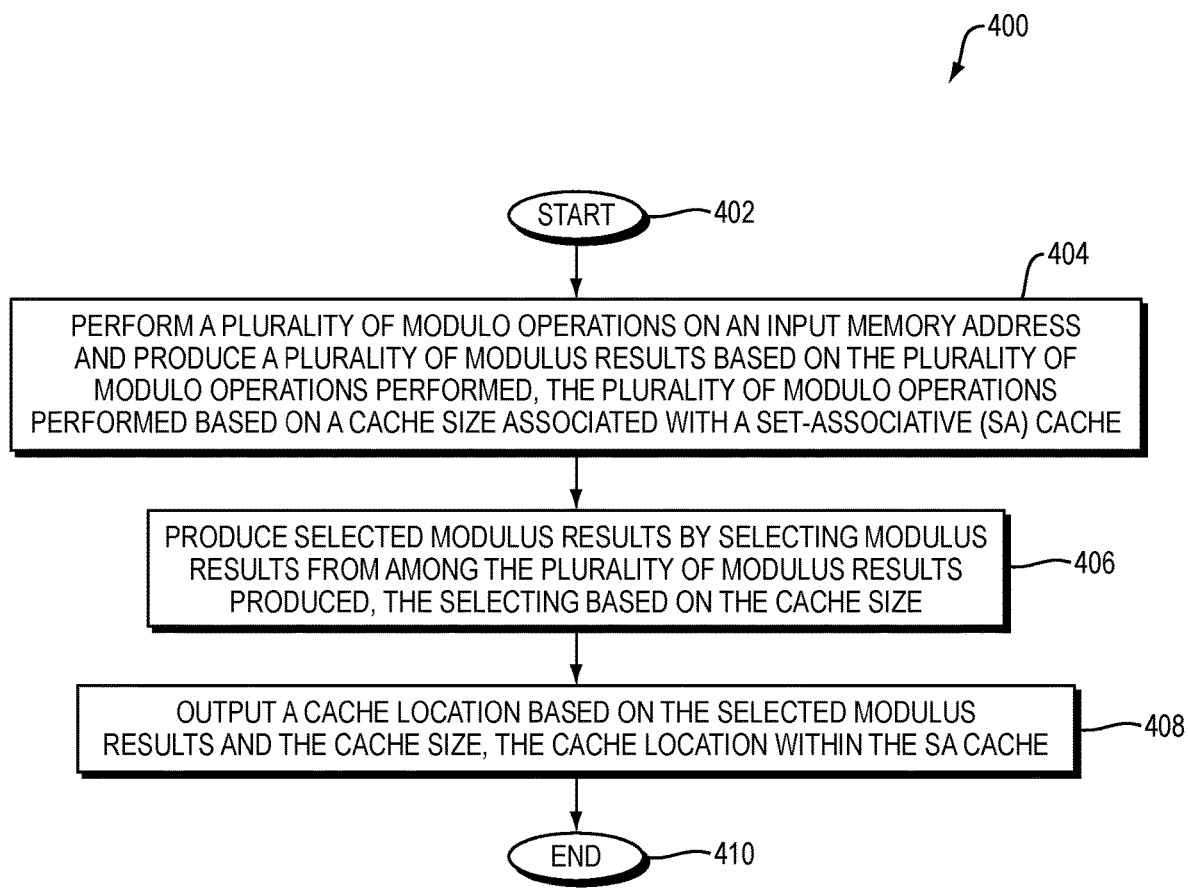
FIG. 4 is a flow diagram of an example embodiment of a method.

FIG. 4 is a flow diagram 400 of an example embodiment of a method. The method may be used to map memory addresses onto cache locations within set-associative (SA) caches of various cache sizes. According to the example embodiment, the method begins (402) and performs a plurality of modulo operations on an input memory address and produces a plurality of modulus results based on the plurality of modulo operations performed, the plurality of modulo operations performed based on a cache size associated with a set-associative (SA) cache (404). The method produces selected modulus results by selecting modulus results from among the plurality of modulus results produced, the selecting based on the cache size (406). The method outputs a cache location based on the selected modulus results and the cache size, the cache location within the SA cache (408). The method thereafter ends (410) in the example embodiment.

The selecting may cause at least a portion of the plurality of modulus results to be steered among a plurality of multiplexers and combined with at least a portion of the input memory address. The cache size may be a given cache size of a plurality of cache sizes supported by a programmable mapper circuit, such as the programmable circuits disclosed above with regard to FIGS. 1-3. Each cache size of the plurality of cache sizes may be associated with a respective equation of a plurality of equations. The method may further comprise programming the programmable mapper circuit based on the cache size to compute the respective equation to map the input memory address onto the cache location.

The method may further comprise programming the programmable mapper circuit based on the cache size to compute a given equation of a plurality of equations, the plurality of equations configured to compute the cache location based on the input memory address.

The programmable mapper circuit may include a plurality of multiplexers. The programming may cause the plurality of multiplexers to perform the selecting in a manner that enables the programmable mapper circuit to compute the given equation.

The programming may further cause the programmable mapper circuit to employ a common set of modulo operations of the plurality of modulo operations to compute the given equation and wherein the common set is shared among the plurality of equations.

The input memory address is (i) a memory address of a memory location in a memory or (ii) a representation of the memory address, and wherein the outputting causes the cache location to be read or written in response to a read from or write to the memory address, respectively.

The outputting may include outputting a row, column, and set that identify the cache location, wherein the row and column identify a bank of a plurality of banks of the SA cache, and wherein the set identifies a given set of a plurality of sets within the bank identified.

The selected modulus results may include first, second, and third selected modulus results. The cache location may be defined by a first location in a first dimension, second location in a second dimension, and third location in a third dimension. The method may further comprise performing respective bitwise left-shift operations on the first, second, and third selected modulus results to produce the first, second, and third locations in the first, second, and third dimensions, respectively, and controlling, based on the cache size, the respective bitwise left-shift operations performed.

Figure 5:
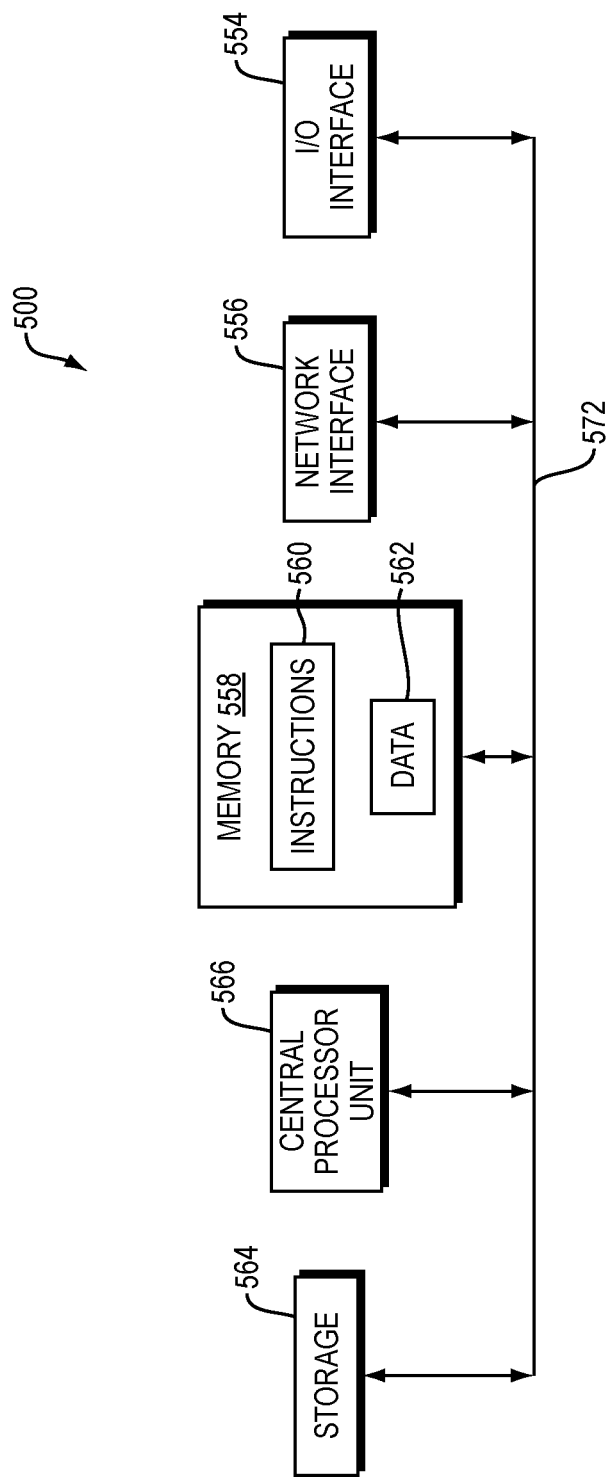
FIG. 5 is a block diagram of an example internal structure of a computer optionally within an embodiment disclosed herein.

FIG. 5 is a block diagram of an example of the internal structure of a computer 500 in which various embodiments of the present disclosure may be implemented. The computer 500 contains a system bus 552, where a bus is a set of hardware lines used for data transfer among the components of a computer or digital processing system. The system bus 552 is essentially a shared conduit that connects different elements of a computer system (e.g., processor, disk storage, memory, input/output ports, network ports, etc.) that enables the transfer of information between the elements. Coupled to the system bus 552 is an I/O device interface 554 for connecting various input and output devices (e.g., keyboard, mouse, displays, printers, speakers, etc.) to the computer 500. A network interface 556 allows the computer 500 to connect to various other devices attached to a network (e.g., global computer network, wide area network, local area network, etc.). Memory 558 provides volatile or non-volatile storage for computer software instructions 560 and data 562 that may be used to implement embodiments of the present disclosure, where the volatile and non-volatile memories are examples of non-transitory media. Disk storage 564 provides non-volatile storage for computer software instructions 560 and data 562 that may be used to implement embodiments of the present disclosure. A central processor unit 566 is also coupled to the system bus 552 and provides for the execution of computer instructions.

Example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:
a modulo-arithmetic circuit configured to perform a plurality of modulo operations on an input memory address and produce a plurality of modulus results based on the plurality of modulo operations performed, the plurality of modulo operations performed based on a cache size associated with a set-associative (SA) cache;
a multiplexer circuit coupled to the modulo-arithmetic circuit and configured to produce selected modulus results by selecting modulus results from among the plurality of modulus results produced, the selecting based on the cache size; and
an output circuit coupled to the multiplexer circuit, the output circuit configured to output a cache location based on the selected modulus results and the cache size, the cache location within the SA cache.

2. The circuit of claim 1, wherein the multiplexer circuit includes a plurality of multiplexers and wherein the selecting causes at least a portion of the plurality of modulus results to be steered among the plurality of multiplexers and combined with respective distinct portions of the input memory address.

3. The circuit of claim 1, wherein the circuit is a programmable mapper circuit, wherein the cache size is a given cache size of a plurality of cache sizes supported by the programmable mapper circuit, wherein each cache size of the plurality of cache sizes is associated with a respective equation of a plurality of equations, and wherein the programmable mapper circuit is programmed based on the cache size to compute the respective equation to map the input memory address onto the cache location.

4. The circuit of claim 1, wherein the circuit is a programmable mapper circuit that is programmed based on the cache size to compute a given equation of a plurality of equations, the plurality of equations configured to compute the cache location based on the input memory address.

5. The circuit of claim 4, wherein the multiplexer circuit includes a plurality of multiplexers and wherein the programmable mapper circuit is programmed based on the cache size to cause the plurality of multiplexers to perform the selecting in a manner that enables the programmable mapper circuit to compute the given equation.

6. The circuit of claim 4, wherein the programmable mapper circuit is further configured to employ a common set of modulo operations of the plurality of modulo operations to compute the given equation and wherein the common set is shared among the plurality of equations.

7. The circuit of claim 1, wherein the input memory address is (i) a memory address of a memory location in a memory or (ii) a representation of the memory address, and wherein outputting the cache location causes the cache location to be read or written in response to a read from or write to the memory address, respectively.

8. The circuit of claim 1, wherein the cache size is based on a total number of sets of the SA cache and wherein the total number of sets is based on a total number of columns of banks of a plurality of banks in the SA cache, a total number of rows of banks of the plurality of banks, and a per-bank set number defining a total number of sets within each bank of the plurality of banks.

9. The circuit of claim 1, wherein the cache location is identified by a row, column, and set, wherein the row and column identify a bank of a plurality of banks of the SA cache, and wherein the set identifies a given set of a plurality of sets within the bank identified.

10. The circuit of claim 1, wherein the selected modulus results produced by the multiplexer circuit include a first, second, and third selected modulus result, wherein the cache location is defined by a first location in a first dimension, second location in a second dimension, and third location in a third dimension, wherein the output circuit includes a plurality of shifters, at least a portion of the plurality of shifters configured to perform respective bitwise left-shift operations on the first, second, and third selected modulus results used to produce the first, second, and third locations in the first, second, and third dimensions, respectively, and wherein the circuit is programmed based on the cache size to control the respective bitwise left-shift operations performed.

11. The circuit of claim 1, wherein the cache size is a given cache size among a plurality of cache sizes of SA caches, wherein the modulo-arithmetic circuit and multiplexer circuit are based on respective decompositions of the plurality of cache sizes into prime factors, and wherein at least a portion of the plurality of modulo operations performed are determined based on the prime factors.

12. A method comprising:
performing a plurality of modulo operations on an input memory address and producing a plurality of modulus results based on the plurality of modulo operations performed, the plurality of modulo operations performed based on a cache size associated with a set-associative (SA) cache;
producing selected modulus results by selecting modulus results from among the plurality of modulus results produced, the selecting based on the cache size; and
outputting a cache location based on the selected modulus results and the cache size, the cache location within the SA cache.

13. The method of claim 12, wherein the selecting causes at least a portion of the plurality of modulus results to be steered among a plurality of multiplexers and combined with respective distinct portions of the input memory address.

14. The method of claim 12, wherein the cache size is a given cache size of a plurality of cache sizes supported by a programmable mapper circuit, wherein each cache size of the plurality of cache sizes is associated with a respective equation of a plurality of equations, and wherein the method further comprises programming the programmable mapper circuit based on the cache size to compute the respective equation to map the input memory address onto the cache location.

15. The method of claim 12, further comprising programming a programmable mapper circuit based on the cache size to compute a given equation of a plurality of equations, the plurality of equations configured to compute the cache location based on the input memory address.

16. The method of claim 15, wherein the programmable mapper circuit includes a plurality of multiplexers and wherein the programming causes the plurality of multiplexers to perform the selecting in a manner that enables the programmable mapper circuit to compute the given equation.

17. The method of claim 15, wherein the programming further causes the programmable mapper circuit to employ a common set of modulo operations of the plurality of modulo operations to compute the given equation and wherein the common set is shared among the plurality of equations.

18. The method of claim 12, wherein the input memory address is (i) a memory address of a memory location in a memory or (ii) a representation of the memory address, and wherein outputting the cache location causes the cache location to be read or written in response to a read from or write to the memory address, respectively.

19. The method of claim 12, wherein the cache size is based on a total number of sets of the SA cache and wherein the total number of sets is based on a total number of columns of banks of a plurality of banks in the SA cache, a total number of rows of banks of the plurality of banks, and a per-bank set number defining a total number of sets within each bank of the plurality of banks.

20. The method of claim 12, wherein the outputting includes outputting a row, column, and set that identify the cache location, wherein the row and column identify a bank of a plurality of banks of the SA cache, and wherein the set identifies a given set of a plurality of sets within the bank identified.

21. The method of claim 12, wherein the selected modulus results include first, second, and third selected modulus results, wherein the cache location is defined by a first location in a first dimension, second location in a second dimension, and third location in a third dimension, wherein the method further comprises performing respective bitwise left-shift operations on the first, second, and third selected modulus results to produce the first, second, and third locations, respectively, in the first, second, and third dimensions, respectively, and controlling, based on the cache size, the respective bitwise left-shift operations performed.

22. The method of claim 12, wherein the cache size is a given cache size among a plurality of cache sizes of SA caches and wherein at least a portion of the plurality of modulo operations performed are determined based on prime factors, the cache size decomposed into the prime factors.

23. A system comprising:
a programmable mapper circuit configured to map an input memory address onto a cache location, the programmable mapper circuit including a modulo-arithmetic circuit, a multiplexer circuit, and an output circuit, the modulo-arithmetic circuit configured to perform a plurality of modulo operations on the input memory address and produce a plurality of modulus results based on the plurality of modulo operations performed, the plurality of modulo operations performed based on a cache size; and
a set-associative (SA) cache coupled to the programmable mapper circuit, the cache size associated with the SA cache, the multiplexer circuit configured to produce selected modulus results by selecting modulus results from among the plurality of modulus results produced, the selecting based on the cache size, the output circuit configured to output the cache location based on the selected modulus results and the cache size, the cache location within the SA cache.

24. A non-transitory computer-readable medium having encoded thereon a sequence of instructions which, when loaded and executed by a processor, causes the processor to:
perform a plurality of modulo operations on an input memory address and producing a plurality of modulus results based on the plurality of modulo operations performed, the plurality of modulo operations performed based on a cache size associated with a set-associative (SA) cache;
produce selected modulus results by selecting modulus results from among the plurality of modulus results produced, the selecting based on the cache size; and
output a cache location based on the selected modulus results and the cache size, the cache location within the SA cache.

25. A system comprising:
means for performing a plurality of modulo operations on an input memory address and producing a plurality of modulus results based on the plurality of modulo operations performed, the plurality of modulo operations performed based on a cache size associated with a set-associative (SA) cache;
means for producing selected modulus results by selecting modulus results from among the plurality of modulus results produced, the selecting based on the cache size; and
means for outputting a cache location based on the selected modulus results and the cache size, the cache location within the SA cache.

* * * * *

UNITED STATES PATENT AND TRADEMARK OFFICE
CERTIFICATE OF CORRECTION

PATENT NO. : 11,416,405 B1
APPLICATION NO. : 17/169079
DATED : August 16, 2022
INVENTOR(S) : Albert Ma It is certified that error appears in the above-identified patent and that said Letters Patent is hereby corrected as shown below:

In the Specification

In Column 1, Line 25, delete "Nis" and insert -- N is --

In Column 10, Line 6, delete "second combiner 241a" and insert -- second combiner 241b --

In Column 10, Lines 52-53, delete "second location 226c" and insert -- second location 226b --

In Column 11, Lines 53-54, delete "identifier (ID) 256." and insert -- identifier (ID) 258. --

In Column 12, Line 43, delete "206-2," and insert -- 206-2), --

Signed and Sealed this
First Day of November, 2022

Katherine Kelly Vidal
*Director of the United States Patent and Trademark Office*